(12) United States Patent
Dixon et al.

(10) Patent No.: US 7,652,409 B2
(45) Date of Patent: Jan. 26, 2010

(54) POSITIONER DEVICE

(75) Inventors: Michael John Dixon, Ely (GB); Terence James Herbert, Hatfield Heath (GB)

(73) Assignee: Thorlabs, Inc., Newton, NJ (US)

( * ) Notice: Subject to any disclaimer, the term of this patent is extended or adjusted under 35 U.S.C. 154(b) by 158 days.

(21) Appl. No.: 10/589,684

(22) PCT Filed: Jan. 31, 2005
(Under 37 CFR 1.47)

(86) PCT No.: PCT/GB2005/000320

§ 371 (c)(1),
(2), (4) Date: Oct. 3, 2008

(87) PCT Pub. No.: WO2005/081330

PCT Pub. Date: Sep. 1, 2005

(65) Prior Publication Data

US 2009/0167113 A1 Jul. 2, 2009

(30) Foreign Application Priority Data

Feb. 20, 2004 (GB) .................................. 0403821.2

(51) Int. Cl.
*H01L 41/08* (2006.01)
*H02N 2/00* (2006.01)
*F16H 21/44* (2006.01)
*G02B 21/26* (2006.01)

(52) U.S. Cl. ...................... 310/328; 74/490.08; 74/110; 74/519

(58) Field of Classification Search ................. 310/328; 74/490.08, 110, 519
See application file for complete search history.

(56) References Cited

U.S. PATENT DOCUMENTS 3,902,084 A 8/1975 May, Jr.
3,902,085 A 8/1975 Bizzigotti
4,675,568 A 6/1987 Uchikawa et al.
4,874,980 A 10/1989 Mine et al.
(Continued)

FOREIGN PATENT DOCUMENTS

EP 0 510 698 A1 10/1992
(Continued)

OTHER PUBLICATIONS

Pohl, D.W., "Dynamic piezoelectric translation devices," *Rev. Sci. Instrum.*, 58(1), Jan. 1987.
Combined Search and Examination Report under Sections 17 and 18(3) dated Feb. 28, 2003, from counterpart Great Britain Application No. GB 0301937.9.
Invitation to Pay Additional Fees mailed Mar. 11, 2005, from counterpart.
(Continued)

*Primary Examiner*—Thomas M Dougherty
(74) *Attorney, Agent, or Firm*—Graham Curtin, PA (57) ABSTRACT

A positioner (2) for moving a sample platform (6) relative to a base (4) is described. The positioner is driven by a piezoelectric arranged to expand and contract along a drive axis, the piezoelectric element has an input end coupled to the base and an output end coupled to first (14) and second (16) output levers extending away from the drive axis of the piezoelectric element in opposing directions. The output levers each have an inner arm arranged to be acted on by the piezoelectric element as it expands and an outer arm to which the sample platform is mounted via platform supports (26, 28). The output levers are mounted such that the piezoelectric element acts on the inner arms of the output levers to cause the outer arms to move in a plane containing the drive axis. This motion of the output levers is communicated via the platform supports to the sample platform, so moving it relative to the base along a direction parallel to the drive axis.

40 Claims, 5 Drawing Sheets

U.S. PATENT DOCUMENTS

| | | | |
|---|---|---|---|
| 5,303,035 | A | 4/1994 | Luecke et al. |
| 5,946,969 | A | 9/1999 | Munekata et al. |
| 6,294,859 | B1 * | 9/2001 | Jaenker ............ 310/328 |
| 6,346,710 | B1 | 2/2002 | Ue |
| 6,484,602 | B1 | 11/2002 | Dagalakis et al. |
| 2004/0207294 | A1 * | 10/2004 | Moler ............ 310/328 |
| 2007/0290567 | A1 * | 12/2007 | Adaniya et al. ........ 310/218 |

FOREIGN PATENT DOCUMENTS

| | | |
|---|---|---|
| EP | 0 937 961 A2 | 8/1999 |
| EP | 1 716 603 B1 | 10/2007 |
| FR | 2 497 995 | 7/1982 |
| GB | 2 334 593 A | 8/1999 |
| GB | 2 411 288 B | 8/2005 |
| JP | 2-119277 | 5/1990 |
| WO | WO 2005/081330 A2 | 9/2005 |

OTHER PUBLICATIONS

PCT Application No. PCT/GB2005/000320 filed Jan. 31, 2005.

Response to the Invitation to Pay an Additional Search Fee mailed Nov. 25, 2005, from counterpart PCT Application No. PCT/GB2005/000320 filed Jan. 31, 2005.

International Search Report and Written Opinion mailed Feb. 2, 2006, from counterpart PCT Application No. PCT/GB2005/000320 filed Jan. 31, 2005.

PCT Demand and claim amendments mailed Apr. 24, 2006, from counterpart PCT Application No. PCT/GB2005/000320 filed Jan. 31, 2005.

International Preliminary Report on Patentability mailed Jun. 2, 2006, from counterpart PCT Application No. PCT/GB2005/000320 filed Jan. 31, 2005.

* cited by examiner

POSITIONER DEVICE

CROSS-REFERENCE TO RELATED APPLICATIONS

This application claims the benefit of Great Britain Patent Application No. 0403821.2 filed Feb. 20, 2004, and PCT Application No. PCT/GB2005/000320 filed Jan. 31, 2005, which are herein incorporated by reference in their entirety.

BACKGROUND OF THE INVENTION

The invention relates to positioners which are widely used for a variety of applications including the positioning of optical components, both in production lines and in scientific experiments.

One shortcoming of positioners designed to provide a high degree of accuracy in their positioning is that they are often only able operate over a relatively limited range. For example, a number of positioner designs employ piezoelectric drive elements in their drive mechanisms. Piezoelectric drive elements are useful because they are relatively robust and are able to provide repeatable high precision positioning. However, a 38 mm long piezoelectric stack might have a positioning range of only 42 μm. This limited range can mean positioners employing piezoelectric drive elements can be impractical for many applications. Similar problems can arise with other types of high precision drive mechanisms.

U.S. Pat. No. 3,902,084, [1] and U.S. Pat. No. 3,902,085 [2] describe "inchworm positioners" which address this problem. These are one-axis positioners arranged to selectively grip and release opposing ends of a piezoelectric drive element as it is cyclically expanded and contracted. Appropriate control of the piezoelectric drive element and the piezoelectric grips at either end can cause the piezoelectric drive element to inch its way along between the grips during successive expand and contract cycles. Although positioners of this type allow for larger ranges of motion, they are complex designs requiring a number of moving parts which must be separately controlled in a carefully orchestrated manner.

Another approach is to use a positioner comprising two elements in frictional engagement with one another which slide relative to one another when the frictional force between them is overcome. Motion is generated by the interplay between inertia of one of the elements and slipping or sticking of the frictional engagement between the elements. Positioners of this kind are referred to as inertial positioners or slip-stick positioners and are known for example from an article by Dieter Pohl in the journal "Review of Scientific Instruments" [3]. Inertial slip-stick positioners can be made with relatively few major components. However, known inertial slip-stick positioners have a low load bearing capacity and a high degree of sensitivity to orientation, unlike the above described inchworm positioners.

An alternative solution would be to use a lever arrangement to magnify or amplify the motion. JP 02 119277 [4] describes a mechanical amplifier for a piezoelectric drive element, albeit one designed primarily for dot-matrix printer heads. The device of JP 02 119277 employs a pair of hinged levers mounted at opposing ends of a piezoelectric stack such that the lever's outer arms are brought together as their inner arms are pushed apart by the piezoelectric element expanding. A buckle spring connects between the lever's outer arms and buckles outwardly as the lever arms are brought together. The outward motion of the buckle spring provides the useful output of the device. EP 0 510 698 [5] employs principles similar to those of JP 02 119277, but has two buckle springs connected in series between the levers. This provides for two simultaneous displacement outputs. Devices of this kind are not generally suitable for the reliable positioning of sample platforms. This is because their sprung nature makes them prone to vibration, and their buckling movement will generally be different for different platform loads. This means samples having different masses will generally be positioned differently for the same expansion of the piezoelectric drive element.

SUMMARY OF THE INVENTION

According to a first aspect of the invention there is provided a positioner comprising: a base and a sample platform moveable relative to the base; a drive mechanism arranged to act between the base and the sample platform; and a plurality of levers extending away from each other, the levers supporting the sample platform and being connected to the drive mechanism so that actuation of the drive mechanism is transmitted under mechanical advantage of the levers to position the sample platform.

The use of levers allows the motion of the drive mechanism, for example the expansion or contraction of a piezoelectric element, to be amplified before being transmitted to the sample platform. Furthermore, by mounting the sample platform on a plurality of levers extending away from each other, a stable mounting can be achieved which is resistant to torque forces applied by the weight of a sample on the sample platform, for example where the sample is located off-centre. In addition, the use of a plurality of levers allows the arcuate motions associated with each of the individual levers to be combined to provide a linear motion of the sample platform.

Throughout the following, the levers will sometimes be referred to as output levers. This term reflects that they support the sample platform, which may be considered an output stage of the positioner.

Each lever can be rotatably mounted on a fulcrum which subdivides the levers into inner and outer arms with the inner arms being connected to the drive mechanism and the outer arms supporting the sample platform.

This allows for simple lever and drive mechanism configurations. However, it will be appreciated that other configuration are possible. For example, the sample platform and drive mechanism may both be coupled to the output arms, the relative locations of their couplings determining the mechanical advantage.

The drive mechanism may be arranged to act on each of the levers in the same direction such that they move in a similar manner to one another when the drive mechanism is actuated.

The plurality of levers may comprise two levers extending in opposing directions.

The levers may be connected to one another by a flexible hinge. The flexible hinge may be a leaf spring connecting between the levers, for example, or the levers may be formed from a single cross member. The flexible hinge being provided by a thinned section of the cross member.

Connecting the levers in this way provides a restoring force as each of the levers are pivoted about their fulcrums, sometimes referred to as flexible pivots, away from their rest positions. This restoring force provides a support force for the sample platform. By forming the levers from a single cross member, a structurally robust and easy to assemble configuration having a low number of parts can be provided.

Support walls may be used for pivotably supporting the levers at their fulcrums, the levers being connected to the support walls by flexible connections providing the fulcrums which allow them to pivot. Furthermore, each lever and its support wall may be of unitary construction with the flexible connections being provided by thinned sections at the junctions between the levers and support walls.

This kind of flexible pivot provides a further restoring force as each of the levers are pivoted, so increasing the support force for the sample platform. The unitary construction is structurally robust and easy to assemble having a low number of parts.

The support walls providing the flexible pivot support may be configured to be independently flexed. For example, a piezoelectric transducer may be bonded to a face of one of support walls which can be driven to expand, so causing the support wall to flex. Flexing one or other (or both) support walls reduces their effective length relative to one another. This can cause relative movement between the fulcrums of the different levers. Because the sample platform is connected to each of the levers, this relative movement between the fulcrums leads to a rotation of the sample platform with respect to the base, so allowing for angular positioning.

The sample platform may be mounted on the levers by a pair of output linkages which are stiff in respect of forces applied parallel to their axes of extent. This allows motion to be reliably transferred from the levers to the sample platform.

The output linkages may be deformable in respect of forces applied transverse to their axes of extent. This assists the positioner to accommodate the transverse components of the arcuate motion of the levers and so provide the linear motion of the sample platform. In other cases, resilient mountings between the output linkages and the levers and/or the sample platform may be provided to accommodate these transverse motion components.

The flexible output linkages allow the positioner to reliably position the sample platform parallel to the drive axis, even if the sample platform is being moved or is offset relative to the base in a direction which is transverse to the drive axis, the transverse movement being accommodated by flexure of the output linkages. This allows a number of the positioners to be connected in parallel in a multi-axis positioner. For example, two or three orthogonally mounted positioners may be connected between a common base and a common sample platform to provide a two- or three-axis positioner.

The output linkages may extend substantially parallel to a drive axis along which the drive mechanism supplies an actuation force.

The output linkages may extend away from the levers on the same side as that on which the drive mechanism, or a significant part of it, is located.

This "doubling-back" of the output linkages allows the use of relatively long output linkages in a small space. The use of long output linkages improves their flexibility. In addition, long output linkages provide for a relatively large radius of curvature for the transverse motions associated with either the arcuate motion of the levers, or the transverse motion of the sample platform relative to the base in a multi-axis positioner. Having a large radius of curvature acts to reduce the coupling between the transverse and longitudinal components of the motion of the positioner.

The positioner may further comprise biasing elements, for example springs, e.g. helical springs, connected to each lever and arranged to resist movement of the levers relative to the base. The biasing acts to provide an additional restoring force for the levers as they are moved by the drive mechanism. This further increases the load which the positioner can reliably support and position.

The positioner may further comprise a stop mechanism connected to each lever to limit the amount by which it can move relative to the base. This helps to prevent the positioner from being damaged, for example by being overloaded or over driven by the drive mechanism.

In general, the geometry of the levers and the locations at which the sample platform and the drive mechanism are coupled to them, will be such that the sample platform moves by an amount greater than an amount by which the drive mechanism moves. That is to say the mechanical advantage, or mechanical amplification, of the lever's action will be greater than unity. However, in some examples the arrangement will be such the sample platform moves by an amount less than an amount by which the drive mechanism moves. That is to say the mechanical advantage, or mechanical amplification, of the lever's action will be less than unity. This arrangement effectively gears-down the expansion or contraction of the piezoelectric element. This allows a sample to be positioned more accurately than the drive mechanism precision.

The positioner may include one or more strain gauges for measuring the position of the levers. There are a number of points at which strain gauges may be mounted. For example, strain gauges may be coupled to the parts drive mechanism. For example, they may be bonded to the side of a piezoelectric element which might form part of the drive mechanism. This allows the movement of the drive mechanism to be measured, from which the positions of the levers can be calculated. From the positions of the levers, the position of the sample platform relative to the base can be determined. Strain gauge output signals can also be used in a feed back control loop to improve the positioning stability, i.e. to provide an encoder device.

The one or more strain gauges may be coupled to respective bridge measuring circuits. For example, Wheatstone bridge measuring circuits, which are mounted on the positioner itself. This can help to reduce effects arising from temperature differentials between different elements of the bridge circuitry. In some embodiments, a strain gauge may be used in each arm of the bridge circuitry to provide increased sensitivity.

The positioner may include a further plurality of levers extending away from each other, the further levers being connected to the base and the drive mechanism so that actuation of the drive mechanism is transmitted to the further levers to cause them to move with respect to the base.

Each further lever may be rotatably mounted on a fulcrum, thereby subdividing the further levers into inner and outer arms with the inner arms connected to the drive mechanism and the outer arms connected to the base.

The further levers may be arranged such that the drive mechanism acts on each of the further levers in the same direction. This may be a direction which is different to that in which the drive mechanism acts on the first mentioned, or output, levers.

Throughout the following, the further levers will sometimes be referred to as input levers. This term reflects that they are coupled to the base, which may be considered an input stage of the positioner.

The input levers generally mirror the output levers and so provide a positioner with a high degree of symmetry. It will be understood that the design and construction of the input levers may include a number of features which correspond to those described above for the output levers.

A pair of input linkages may be used for connecting the base to the input levers, the input linkages being stiff in respect of forces applied parallel to their axes of extent but deformable in respect of forces applied transverse thereto. The input linkages may again be doubled-back, i.e. extending away from the input levers on the same side as that on which the drive mechanism is located, to allow for long linkages in a small space.

By providing a highly symmetric design such as this, movement of the drive mechanism can be transferred to the sample platform via a combined motion of the output and input levers. This means the output levers only need pivot by approximately half the amount they would otherwise do if there were no input levers to accommodate part of the motion of the drive mechanism. This reduces residual effects associated with the arcuate motion of the levers.

The highly symmetric design additionally reduces the number of different component parts of the positioner, so providing for more simple manufacture.

According to a second aspect of the invention there is provided a multi-axis positioner comprising a first positioner according to the first aspect of the invention aligned along a first direction and a second positioner according to the first aspect of the invention aligned along a second, different, direction, the first and second positioners connecting between a common base and a common sample platform.

The multi axis-positioner may further comprise a third positioner according to the first aspect of the invention aligned along a third direction, the third direction being different to the first and second directions, the third positioner connecting between the common base and the common sample platform.

In this way, a multi-axis positioner having a parallel mechanism may be provided having up to six degrees of freedom. Where six degrees of freedom are not required, fewer may be provided. For example, the third positioner might not provide for rotation of the sample platform, such that a five-axis positioner is provided.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
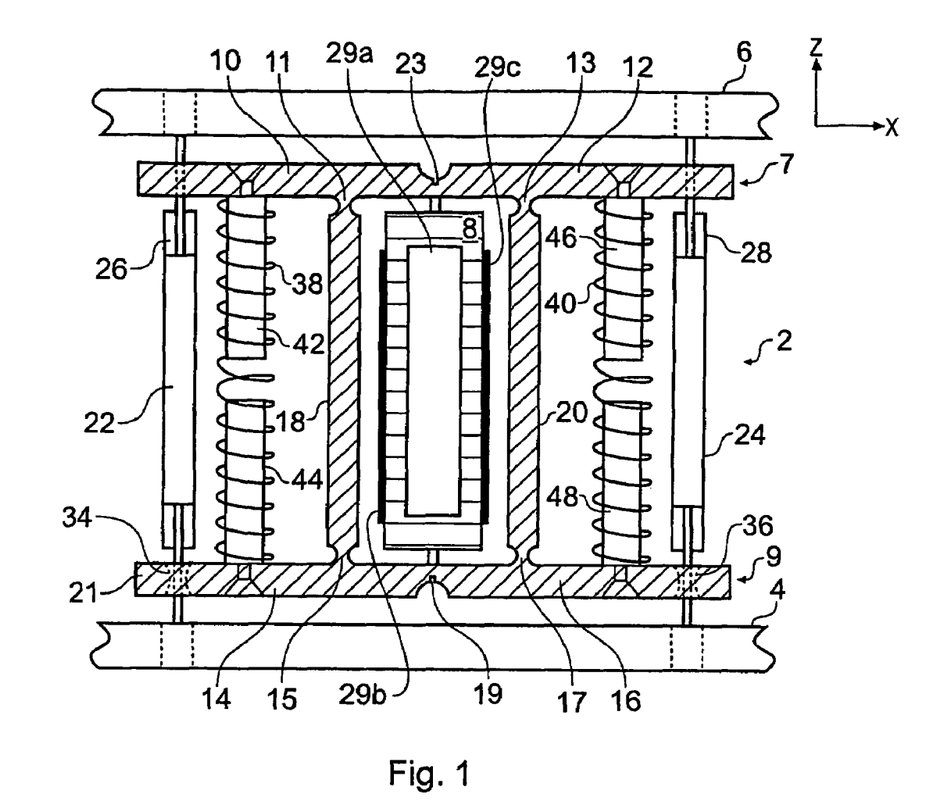
FIG. 1 schematically shows a front view of a one-axis positioner according to a first embodiment of the invention.
Figure 2:
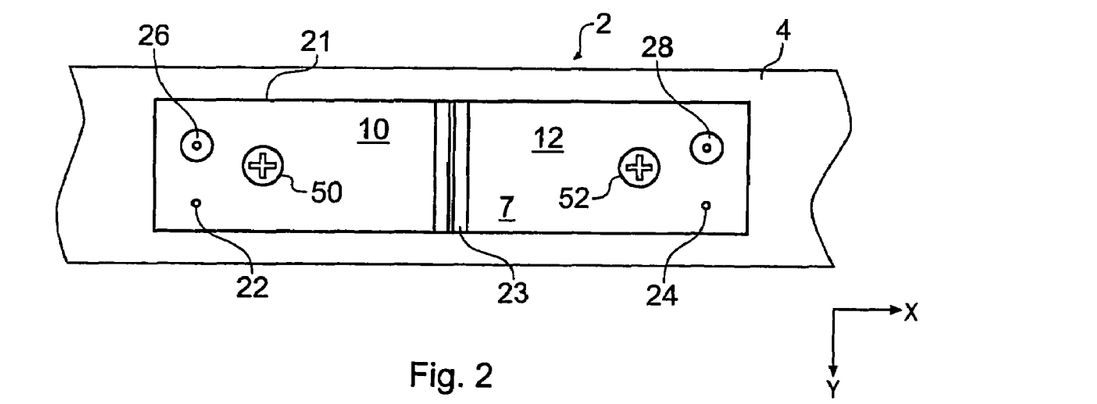
FIG. 2 schematically shows an end view of the positioner shown in FIG. 1.
Figure 3:
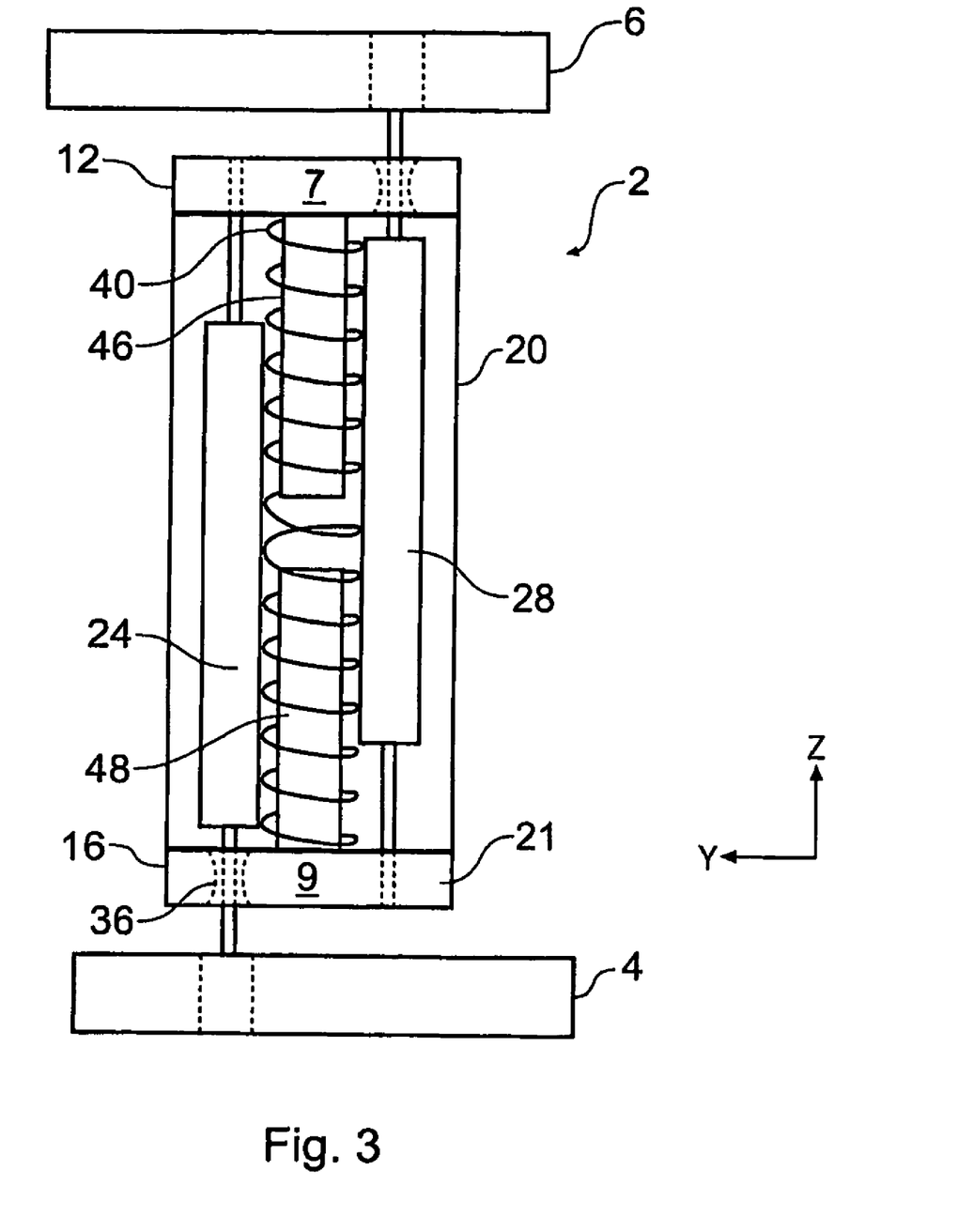
FIG. 3 schematically shows a side view of the positioner shown in FIG. 1.

FIGS. 1, 2, 3 and 4 schematically show respective front, end, side and perspective views of a positioner 2 according to a first embodiment of the invention. The positioner 2 is described with reference to a three-dimensional Cartesian co-ordinate system and terms such as upper and lower refer to the orientation shown in FIG. 1. It will be appreciated, however, that the positioner can be equally be used in other orientations. The front view of FIG. 1 is taken along a y-axis, the end view of FIG. 2 is taken along a z-axis and the side view of FIG. 3 is taken along an x-axis. A legend in each figure indicates the Cartesian plane of the figure.

The positioner 2 is a one-axis positioner for moving a sample platform (or output stage) 6 relative to a base (or input stage) 4 along the z-axis. (The sample platform 6 is not shown in FIGS. 2 or 4 and the base 4 is also not shown in FIG. 4). The positioner in this example has a characteristic size of around 55 mm in the x- and z-directions and about 15 mm in the y-direction. However, it is noted the design is inherently scaleable so these dimensions could be much smaller or larger if desired. In fact, the design could be useful for a micro-electromechanical system (MEMS) or nano-technology environment implemented in semiconductor materials using etch technology. The positioner comprises a main body member 21 made of stainless steel, a piezoelectric element 8, a pair of input flexible linkages 22, 24 connecting the main body 21 to the base 4, a pair of output flexible linkages 26, 28 connecting the main body 21 to the sample platform 4, load springs 38, 40 and mounting spigots 42, 44, 46, 48 for the load springs. The piezoelectric element 8 is schematically illustrated as a stack, but it will be understood that a tube or other form of piezoelectric element could be used. Other kinds of actuator, such as a driven screw, may also be used.

In this example, the main body 21 is of unitary construction and comprises an input cross member 7 to which the input flexible linkages 22, 24 are attached and an output cross member 9 to which the output flexible linkages 26, 28 are attached. The input and output cross members 7, 9 are separated from one another by first and second support walls 18, 20. The input cross member 7 has a cut-out in its upper face running parallel to the y-axis. This provides for an input flexure hinge 23 which allows the input cross member to flex at its centre. The output cross member 9 has a similar cut-out in its lower face. This provides for an output flexure hinge 19 which allows the output cross member to flex at its centre. The connections between the respective ends of the first and second support walls 18, 20 and the input and output cross members 7, 9 comprise thinned sections of the main body 21 extend along the y-direction so as to provide respective flexure pivots 11, 13, 15, 17 which act as fulcrums.

The combination of flexure hinges 23, 19 in the cross members 7, 9 and the flexure pivots 11, 13, 15, 17 provide for four levers 10, 12, 14, 16. The input cross member 7 is divided by its flexure hinge 23 into a first input lever 10 and a second input lever 12 with respective ones of the flexible pivots 11, 13 providing fulcrums for each of the input levers. The output cross member 9 is divided by its flexure hinge 19 into a first output lever 10 and a second output lever 12 with respective ones of the flexible pivots 15, 17 providing fulcrums for each of the output levers. Accordingly, the input and output levers to one side of the piezoelectric element 8 form a first opposing pair of input and output levers 10, 14 while the input and output levers to the other side of the piezoelectric element 8 form a second opposing pair of input and output levers 12, 16. Each lever 10, 12, 14, 16 is subdivided by its respective flexible pivot 11, 13, 15, 17 into an inner arm and an outer arm. The inner arms of the levers are those parts extending inwardly from the flexible pivots towards the flexure hinges. The outer arms are those parts of the levers extending outwardly away from the flexure hinges.

The piezoelectric element 8 extends between the input and output cross members 7, 9 and is positioned between the support walls 18, 20. The piezoelectric element is arranged so as to expand and contract along the z-axis when driven by an appropriate drive signal. The piezoelectric element has an input end adjacent the input cross member 7 and an output end adjacent the output cross member 8. The interfaces between the ends of the piezoelectric element 8 and the cross members 7, 9 are arranged such that the cross members may flex at their flexure hinges without damaging the piezoelectric element. This can be achieved, for example, by employing a bearing pad having a limited contact area aligned with the flexure hinges of the cross members. The piezoelectric element 8 is dimensioned slightly longer than the gap into which it is to be placed. The piezoelectric element is inserted into this undersized gap by first forcing the outer arms of opposing pairs of the input and output levers together. This causes the levers 10, 12, 14, 16 to pivot about their respective flexure pivots 11, 13, 15, 17 such that the gap into which the piezoelectric element is fitted is increased, and the piezoelectric element can be inserted. Once the piezoelectric element is in place, the force applied to the outer arms of the levers is removed so that the main body attempts to re-adopt its unstressed configuration. However, it is prevented from doing so fully by the additional length of the piezoelectric element. This ensures the piezoelectric element is kept under compression. This pre-stressing of the piezoelectric element improves its operating characteristics, as is well known.

A strain gauge is bonded to each side of the piezoelectric element. Three of the strain gauges 29a, 29b, 29c can be seen in FIG. 1. Each strain gauge is configured to measure the degree of expansion or contraction of the piezoelectric element 8. It will be appreciated that the expansion or contraction of the piezoelectric element 8 could be measured using other strain gauge configurations. For example, only one strain gauge might be used. However, multiple strain gauges can provide improved sensitivity.

Figure 5:
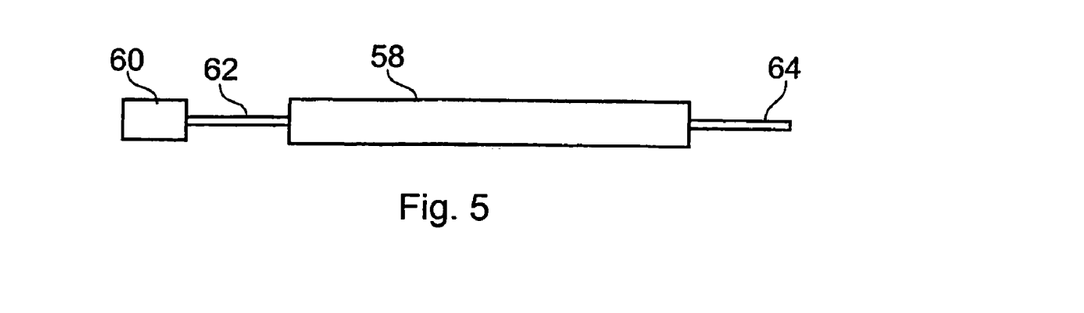
FIG. 5 schematically shows a flexible linkage of the positioner shown in FIG. 1.

FIG. 5 is a schematic cross-section view of one of the input flexible linkages 22 used to connect the input cross member 7 to the base 4. The other flexure linkages 24, 26, 28 are identical in structure to the flexure linkage 22 shown in FIG. 5, although are differently installed in the positioner 2. The linkage is rigid in respect of forces applied along its axis of extent, but flexible in respect of transversely applied forces. It will be appreciated that in some single axis embodiments of the invention, the flexible linkages 22, 24, 26, 28 could be replaced with rigid linkages which are not deformable in respect of transversely applied forces. However, as will be seen further below, flexible linkages of the kind shown in FIG. 5 allow for a positioner which can be easily integrated into a multi-axis positioner. The flexure linkage 22 contains a rigid central body 58 with a mounting dowel 60 attached to one end by a flexible portion 62. A similar flexible portion 64 extends from the other end of the central body but terminates freely. The central body and mounting dowel are made of 3 mm diameter stainless steel rod. The flexible portions are made of 1 mm diameter music wire. The mounting dowel is around 5 mm long and the central body is around 25 mm long. The music wire is received into bores in the central body and the mounting dowel such that approximately 10 mm is left exposed between the central body and the mounting dowel and around 15 mm is left exposed on the other side. The flexible linkage 22 has an overall length of around 55 mm. Because the sections of music wire are relatively short, the flexible linkage has a relatively high longitudinal stiffness but is free to flex in the transverse direction. Linkages of this kind are further described in EP 0 937 961 [6].

Figure 4:
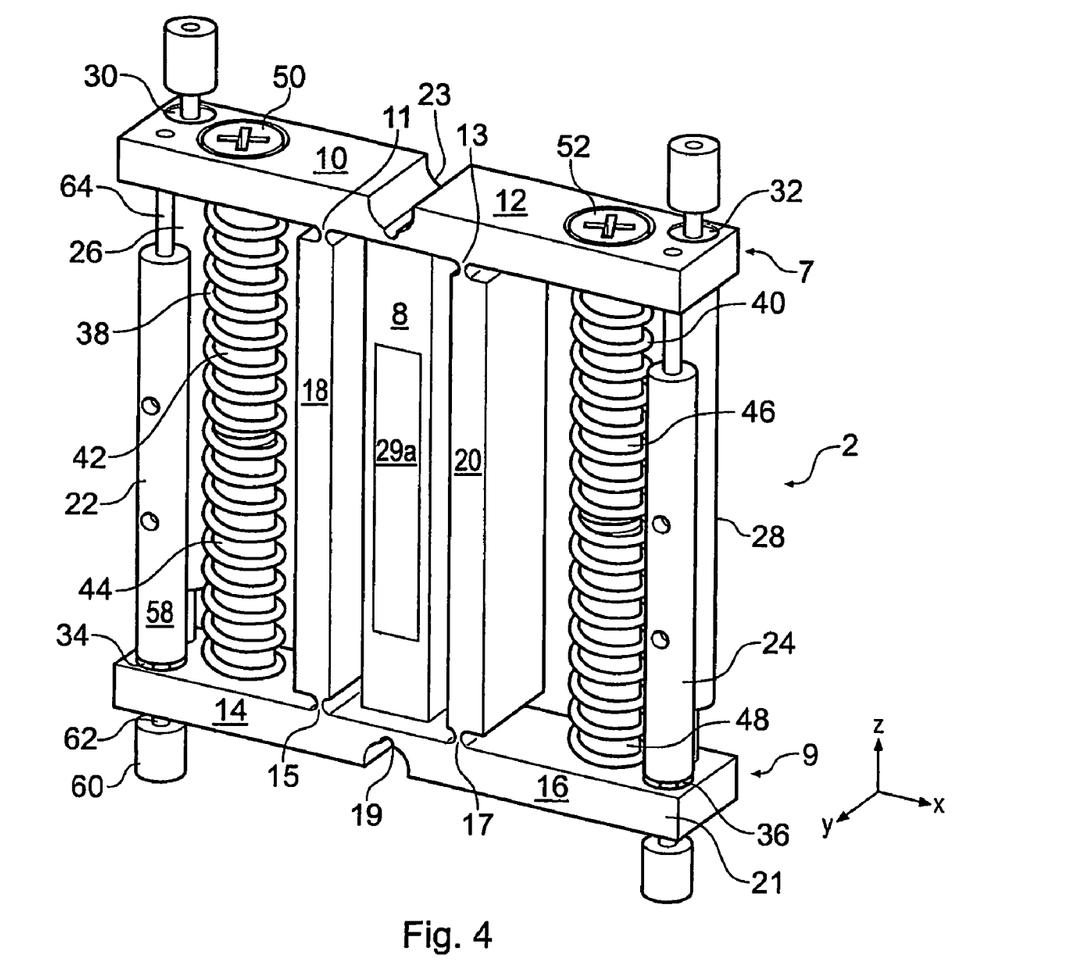
FIG. 4 schematically shows a perspective view of the positioner shown in FIG. 1.

As can be seen from FIG. 4, input flexible linkage 22 is installed in the positioner 2 such that the free-end flexible portion 64 is fixedly connected near the edge of the outer arm of input lever 10. The linkage then extends substantially parallel to the z-axis towards output lever 14, the central body 58 being disposed between the opposing lever arms 10, 14. The flexible portion 62 to which the mounting dowel is attached passes through a rubber bushing 34 in the output lever 14. The rubber bushing 34 allows the input flexible linkage 22 to slide freely in a direction parallel to its axis of extent, but not transversely to this axis. A degree of damping is provided by the rubber bushing and this helps to reduce vibrational noise in the positioner. With the positioner 2 in the orientation shown in FIG. 4, the mounting dowel 60 is located beneath the output lever 14. As mentioned above, the base 4 is not shown in FIG. 4. However, as can be seen from FIG. 1, the mounting dowel 60 is received into an opening in the base where it is held in place, for example by gluing or using grub screws.

The other flexible input linkage 24 is installed in a similar fashion, connecting between the input lever 12 and output lever 14, and passing through rubber bushing 36. The mounting dowel of flexible linkage 24 is similarly attached to the base 4. Accordingly, the positioner 2 is supported with respect to the base 4 by the two input flexible linkages. Because the input flexible linkages are longitudinally rigid, the parts of the outer arms of the input levers to which the input flexible linkages attach are fixed relative to the base along the z-direction. However, because of their flexibility to transverse forces, the parts of the outer arms of the input levers to which the input flexible linkages attach may be moved in the x- and y-directions. It will be appreciated that this motion will be arcuate in the xz- and yz-planes respectively, but for ease of explanation, they are described by the direction of their largest component.

The output flexible linkages 26, 28 are installed in an overall similar fashion to the input flexible linkages 22, 24, but, rather than connecting the base to the input levers, they connect the output levers to the sample platform. That is to say, the free end flexible portions of the output flexible linkages are fixedly connected near the edge of the outer arms of respective ones of the output levers 14, 16. The linkages then extend substantially parallel to the z-axis towards input levers 10, 12. For the orientation shown in FIG. 4, the mounting dowels of the output flexible linkages are located above the input levers 10, 12. The sample platform 6 is not shown in FIG. 4. However, as can be seen from FIG. 1, the mounting dowels of the output flexible linkages are received into openings in the sample platform where they are held in place.

Accordingly, the sample platform 6 is supported relative to the base along the z-axis via the output flexible linkages which connect it to the main body 21 which in turn is supported by the input flexible linkages which connect it to the base. The Sample platform is free to move in the x- and y-directions. If this is not desired, support rails or other bracing could be used.

For a positioner in the orientation shown in FIGS. 1 to 4, the weight of a sample on the sample platform applies a load force which is transmitted from the sample platform 6 along the output flexure linkages 26, 28 so as to act downwardly on the outer arms of the output levers 14, 16. The reaction force supporting the weight of the sample is transmitted from the base 4 along the input flexure linkages 22, 24 so as to act upwardly on the outer arms of the input levers 10, 12. The net effect of this is that opposing pairs of input and output levers are urged apart. This motion is resisted by the resilience of the flexure hinges 17 and 19, the resilience of the flexure pivots 11, 13, 15, 17 and the resistance to compression of the piezoelectric element 8. To increase the useful load that the positioner can support without damaging the flexure hinges, flexure pivot or the piezoelectric element 8 and to provide a positive force against displacements, load springs 38, 40 are used. These connect between the outer arms of each opposing pair of input and output levers to provide additional support for the sample platform by effectively increasing the rigidity main body 21. One of the load springs 38 is mounted on a pair of spigots 42, 44 respectively connected to one opposing pair of input and output levers 10, 14. The other load spring 40 is mounted on a similar pair of spigots 46, 48 connected to the other opposing pair of input and output levers 12, 16. The spigots are held in place by screw fixings, two of which 50, 52 can be seen in FIGS. 2 and 4.

The individual pairs of spigots connected to opposing pairs of lever arms are sized such that between them they extend across much of the gap between the input and output lever arms. However, the pairs of spigots do not meet. In the positioner's natural, or rest, configuration (i.e. with no drive signal applied to the piezoelectric element), the spigots are separated by a distance that is approximately one-and-a-half times their expected range of travel during normal use of the positioner 2. This allows the positioner to cover its range of travel freely, but provides protection against attempts to significantly exceed this range as this would cause the spigots to meet. Accordingly, the spigots act as mechanical stops or abutments. Other stop configurations are possible, though it is convenient to combine the stops with the spigot. Safety margins other than 50% are of course possible.

A sample mounted on the sample platform 6 may be moved to a desired position along the z-direction by driving the piezoelectric element 8 to expand or contract. In its natural configuration (i.e. no drive signal applied) the positioner supports the sample at a position $z_0$ along the z-direction, this is referred to as its natural position or rest position. The z co-ordinate is taken to increase upwardly as indicated by the legend in FIG. 1. To move the sample upwardly (i.e. increasing z) from its natural position, a drive signal from a controller (not shown) is applied to the piezoelectric element such that it is driven to expand by an amount $\Delta z^{pz}$. The expansion of the piezoelectric element acts on the inner arms of the input and output levers such that the outer arms of opposing pairs of the input and output levers are brought together as the levers pivot about their respective flexible pivots. Because of the arrangement of input and output flexible linkages, this causes the sample platform 6, and hence the sample supported on it, to move upwardly away from the base 4.

Although the motion of the individual lever arms is arcuate in the plane containing the z-axis of the piezoelectric element, the symmetric motion of the input and output lever arms causes the flexible linkage to move slightly diagonally. Accordingly, as the sample platform raises, in addition to moving relative to each other along the z-direction, the input and output flexible linkages also move inwardly towards the piezoelectric element by a small amount. Because of the symmetry of the positioner about a yz-plane running through the centre of the piezoelectric element, the flexible linkages on one side of the piezoelectric element move inwardly by an amount which is equal and opposite to that of the flexible linkages on the other side. Because of this, no net transverse motion it transferred to the sample platform relative to the base. The small transverse motions of the flexible linkages are accommodated by their flexible portions. Accordingly, the sample platform motion is largely decoupled from the horizontal components of motion associated of the arcuate movement of the outer arms of the levers on which the sample platform is supported. The sample platform therefore moves in a direction which is largely parallel to the z-axis. The amount by which the sample platform 6 moves is determined by the amount by which the piezoelectric element expands and the mechanical advantage of the levers. For the example positioner shown in FIGS. 1 to 5, the effective length of the inner arms of the levers (i.e. the distance between their flexible pivots and the location at which the piezoelectric element 8 acts on them) is one-third of the effective length of the outer of the levers (i.e. the distance between their flexible pivots and the flexible linkages). This means that as the piezoelectric element expands by an amount $\Delta z^{pz}$, the sample platform is raised by an amount $\Delta z^{sp}=3\Delta z^{pz}$. Accordingly, the overall range of motion provided by the positioner is three times that of the piezoelectric element 8 itself. Because of the symmetry of the positioner, this amplification is achieved while maintaining a substantially linear motion of the sample platform parallel to the drive axis of the piezoelectric element. It will be appreciated that other amplifications can be achieved by changing the ratio of the effective lengths of the inner and outer arms of the levers. It is even possible to provide a mechanical advantage of less than unity. Although this reduces the overall range of motion for the positioner, it effectively gears-down the expansion or contraction of the piezoelectric element. This can help to reduce jitter in the position of the sample platform associated with noise in the drive mechanism. For example, due to electronic noise in the drive signal applied to the piezoelectric element.

The sample can be moved further along the z-direction by further expanding the piezoelectric element or the sample can be moved back towards its natural position by contracting the piezoelectric element. It is possible to move the sample downwardly from its natural position by driving the piezoelectric element to contract from its natural configuration. However, a given piezoelectric element will generally allow for a larger range of expansion than it will for contraction. For example, a piezoelectric element might typically be able to contract over a range which is only 10% or so of its expansion range. Accordingly the sample's natural position will typically be selected to correspond to be at or near the lowest position the sample will be required to adopt.

The instantaneous position of the sample platform can be calculated form the positioner's known response to the drive signal applied to the piezoelectric element. Alternatively, it is possible to provide a sensor for making a measurement of the position. This reduces the impact of any long term drifts in the positioner response, and can also be used as a feed-back signal to assist positional stabilisation using a feedback loop.

The position measurement may come from the strain gauges 29a, 29b, 29c mounted to the piezoelectric element 8. Outputs from these strain gauges indicate the degree of expansion or contraction of the piezoelectric element 8. From this, the positions of the levers can be determined, and hence the position of the sample platform with respect to the base calculated. In one example, the strain gauges are incorporated into Wheatstone bridge measurement circuitry mounted locally at the positioner. This reduces effects associated with, for example, thermal variations which might otherwise arise between different elements of the Wheatstone bridge.

In other examples, a more direct measure of the position of the sample platform relative to the base can be provided. For example, by having a linear displacement transducer arranged to measure the overlap of neighbouring pairs of the input and output flexible linkages. In other cases, other feedback mechanisms may be used, for example externally derived signals which depend on the position of a sample. For example, a reflection or interferometric optical encoder.

It will be appreciated that many other configurations of positioner are possible. For example, a single axis positioner that is not to be incorporated into a multi-axis positioner, could employ rigid linkages in place of the flexible linkages for connecting the main body to the base and sample platform. In such cases, slide bearings or resilient bush mountings could be employed at both the base and sample platform fixings to accommodate any transverse motions associated with the arcuate motion of the lever outer arms.

In other examples, the input cross member may be solid such that it does not flex and is instead forms part of, or is rigidly connected to, the base. In such cases the expansion of the piezoelectric element acts wholly on the inner arms of the output levers (there being no input levers). This configuration causes the mounting dowels of the output flexible linkages to have an arcuate, rather than diagonal, motion. The transverse motion component associated with this is again accommodated by the flexibility of the flexible linkages, or by the flexibility of the mountings in cases where rigid linkages are used.

The arrangement of having the input and output flexible linkages doubling-back on one another through the positioner allows relatively long linkages to be used in a small space. This improves the flexibility of the linkages and also provides for a relatively large radius of curvature associated with any transverse motions. This reduces the coupling between the transverse and longitudinal motions of the positioner. However, in some embodiments the flexible linkages may not double back through the positioner, but may instead extend directly away from it. This effectively reverses the direction of motion such that expansion of the piezoelectric element causes the sample platform to move in the opposite direction to that described above.

It will be appreciated that in some examples the output levers, and input levers where present, could be separate elements connected, for example by a leaf spring acting as a flexure hinge, and need not be formed from a single cross member having a cut out to define a flexure hinge. In other examples, the output levers could be separate from one another with no flexure hinge or other direct link between them. In these cases, load springs of the kind shown in FIGS. 1 to 4 can be used to replace the functionality of the flexible hinges (i.e. the function of providing load support and a restoring force). A link between the first and second support walls, or other means, could be used to hold the levers correctly in position relative to one another in such cases.

It will also be appreciated that other kinds of flexure pivot might be used as fulcrums for the levers. For example, in an example which does not include a unitary main body, support walls having an knife edges which sit in V-grooves in the levers may be used to provide the flexible pivots.

It will further be appreciated that piezoelectric element may be configured such that the axis of the piezoelectric element itself is not parallel to the drive axis along which it supplies the actuation, or drive, force. For example, the piezoelectric element may be arranged to expand and contract along one direction and a mechanical drive train configured transfer this motion so as to supply an actuation force along a drive axis.

As previously noted, the above has described a positioner for positioning a sample platform relative to a base along a vertical z-axis. It will be understood this particular orientation is arbitrary and the axis of the positioner can be arranged to position the sample platform relative to the base along any desired direction, including "up-side-down" configurations. References made above to upper, lower, upwardly, downwardly, and so forth, relate only to a positioner in the orientation shown in FIGS. 1 to 4.

Figure 6:
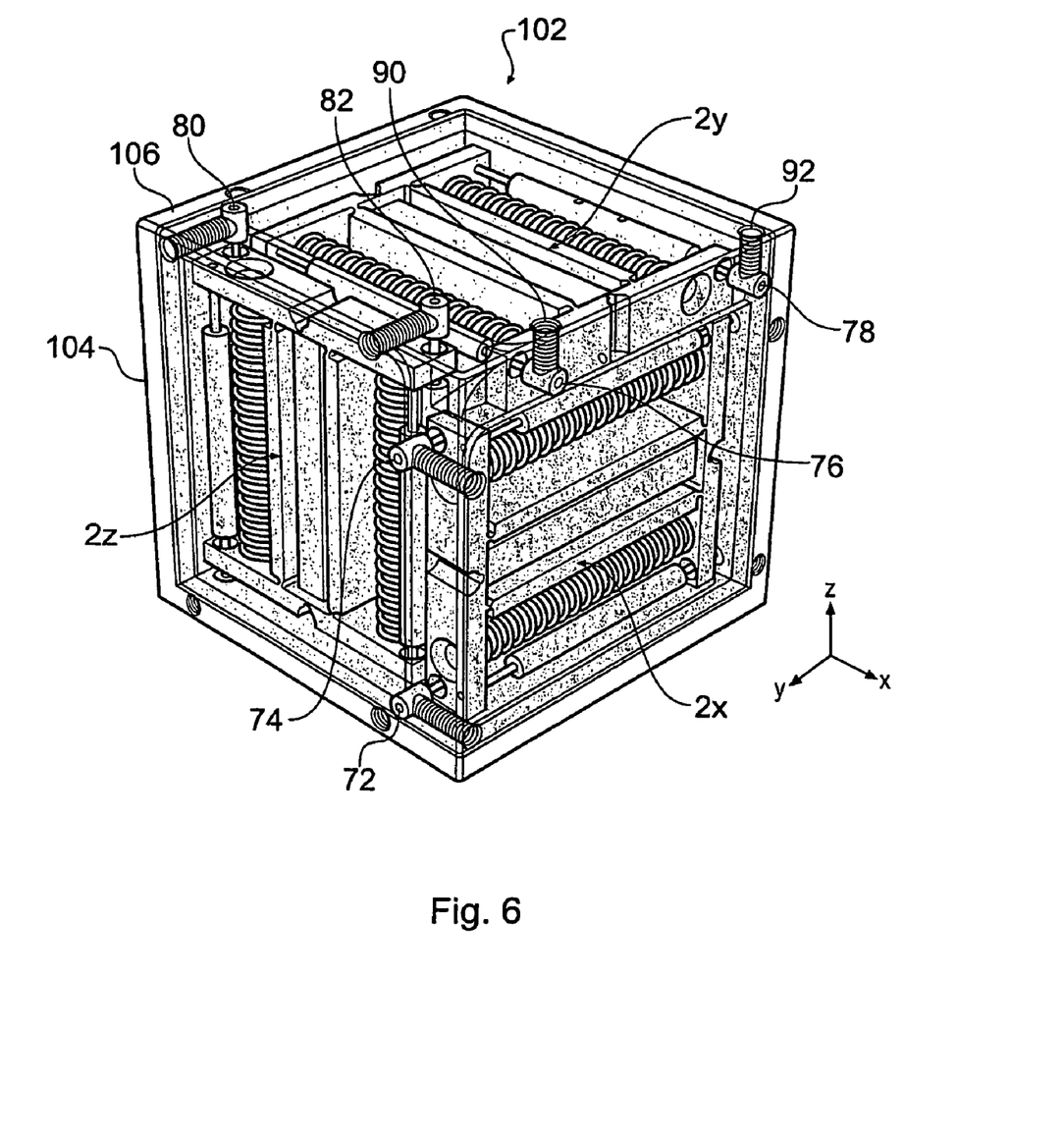
FIG. 6 schematically shows a perspective view of a three-axis positioner according to a second embodiment of the invention.

FIG. 6 schematically shows a perspective view of a positioner 102 according to a second embodiment of the invention. As before, the positioner 102 will be described with reference to a three-dimensional Cartesian co-ordinate system. A legend in the figure indicates the direction of the Cartesian co-ordinates.

The positioner 102 is a three-axis parallel positioner for moving a sample platform (or output stage) 106 relative to a base (or input stage) 104 along the x- y- and z-axes. The outer geometry of the positioner in this example is generally cuboid with a characteristic size of around 55 mm.

Figure 7:
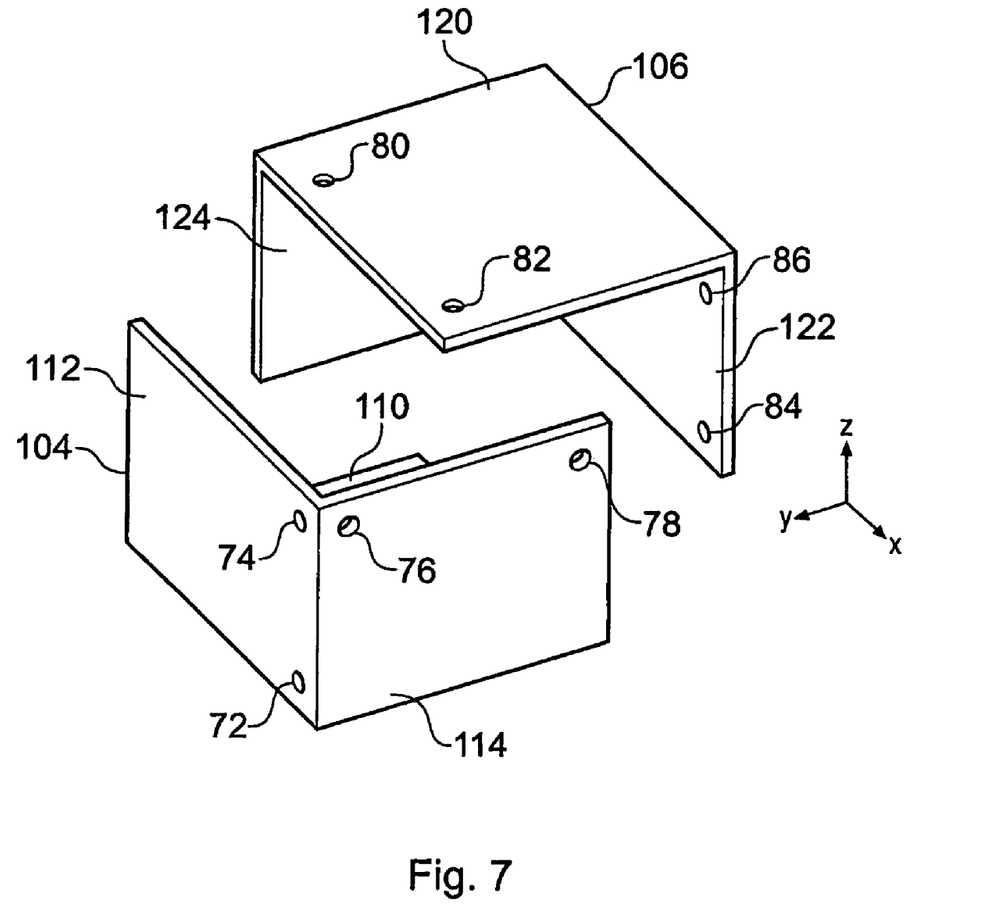
FIG. 7 schematically shows an exploded perspective view of a base and a sample platform for the positioner shown in FIG. 6.

FIG. 7 schematically shows an exploded perspective view of the sample platform 106 and base 104. The base comprises three faces arranged to form three-faces of a cube. An xy-face 110 lies in an xy-plane, an xz-face 112 lies in an xz-plane and a yz-face 114 lies in a yz-plane. The sample platform similarly comprises three faces arranged to form three-faces of a cube, again having an xy-face 120 lying in an xy-plane, an xz-face 122 lying in an xz-plane and a yz-face 124 lying in a yz-plane. In the assembled positioner 102 shown in FIG. 6, the sample platform 106 and base 104 are located near to one another but are not in contact.

As can be seen from FIG. 6, the three-axis positioner 102 comprises three one-axis positioners connecting in parallel along three orthogonal axes between the sample platform 106 and the base 104. These three one-axis positioners are an x-axis positioner $2x$, a y-axis positioner $2y$ and a z-axis positioner $2z$. Each of these is similar, to and operates in the same way as, the positioner 2 described above and shown in FIGS. 1 to 5, except that the x-axis and y-axis positioners are differently oriented.

The x-axis positioner $2x$ is arranged with its drive axis parallel to the x-axis and connects between the yz-face 114 of the base and the yz-face 124 of the sample platform. The mounting dowels for the input flexible linkages of the x-axis positioner $2x$ fit into holes 76, 78 in the yz-face 114 of the base. These dowels are held in place by respective grub screws 90, 92. The mounting dowels for the output flexible linkages of the x-axis positioner $2x$ are similarly fixed into holes (not visible) in the yz-face 124 of the sample platform. Accordingly, when the x-axis positioner is driven as described above for the positioner 2 shown in FIGS. 1 to 5, the sample platform 106 is moved relative to the base 104 along the x-direction.

The y-axis positioner $2y$ is arranged with its drive axis parallel to the y-axis and connects between the xz-face 112 of the base and the xz-face 122 of the sample platform. The mounting dowels for the input flexible linkages of the y-axis positioner $2y$ fit into holes 72, 74 in the xz-face 112 of the base. These dowels are again held by grub screws. The mounting dowels for the output flexible linkages of the y-axis positioner $2y$ are similarly fixed into holes 84, 86 in the xz-face 122 of the sample platform. Accordingly, when the y-axis positioner is driven, the sample platform 106 is moved relative to the base 104 along the y-direction.

The z-axis positioner $2z$ is arranged with its drive axis parallel to the z-axis and connects between the xy-face 110 of the base and the xy-face 120 of the sample platform. The mounting dowels for the input flexible linkages of the z-axis positioner $2z$ fit into holes (not visible) in the xy-face 110 of the base. The mounting dowels for the output flexible linkages of the z-axis positioner $2z$ are fixed into holes 80, 82 in the xy-face 120 of the sample platform. Accordingly, when the z-axis positioner $2z$ is driven, the sample platform 106 is moved relative to the base 104 along the z-direction.

Accordingly, the x-, y- and z-axis positioners may be driven to move and so position the sample platform along all three directions. Because the x-, y- and z-axis positioners each employ flexible linkages for connecting between the base and the sample platform, the positioners associated with each axis are able to accommodate motion along each of the other axes in a manner broadly similar to that described in EP 0 937 961.

Returning to the one axis positioner 2 shown in FIG. 2, in some examples the first and second support walls 18, 20 can be made sufficiently thin that they may be flexed outwardly or inwardly. This can be achieved using a suitably mounted actuator. For example a piezoelectric element bonded to an outer face of one of the support walls may be driven to expand so flexing the support wall. One or more strain gauges may also be mounted on the support wall to measure the degree of flexure. Flexing the support wall on one side has the effect of bringing together the opposing pair of input and output levers on that side so as to increase the separation between the base and the sample platform on the same side. Accordingly, flexing the support walls in this way can allow angular positioning of the sample platform shown in FIGS. 1 to 4 about the y-axis. Employing similar means for flexing the support walls in each of the three positioners shown in FIG. 6 provides for a six-axis positioner.

REFERENCES

[1] U.S. Pat. No. 3,902,084 (Burleigh Instruments Inc.)
[2] U.S. Pat. No. 3,902,085 (Burleigh Instruments Inc.)
[3] Dieter Pohl, "Review of Scientific Instruments", vol. 58, p. 54-57 (1986).
[4] JP 02 119277 (NEC Corp.)
[5] EP 0 510 698 (NEC Corp.)
[6] EP 0 937 961 (Melles Griot Ltd.)

The invention claimed is:

1. A positioner comprising:
a base and a sample platform moveable relative to the base;
a drive mechanism arranged to act between the base and the sample platform;
a plurality of levers extending away from each other, the levers supporting the sample platform and being connected to the drive mechanism so that actuation of the drive mechanism is transmitted under mechanical advantage of the levers to position the sample platform, wherein each lever is rotatably mounted on a fulcrum, thereby subdividing the levers into inner and outer arms with the inner arms connected to the drive mechanism and the outer arms supporting the sample platform; and
support walls that connect to the levers by flexible connections to form the fulcrums.

2. The positioner according to claim 1, wherein the drive mechanism is arranged to act on the levers in the same direction.

3. The positioner according to claim 1, wherein the drive mechanism comprises a piezoelectric element.

4. The positioner according to claim 1, wherein the plurality of levers comprises at least one pair of levers that extend in opposite directions to each other.

5. The positioner according to claim 1, further comprising a flexible hinge interconnecting at least some of the levers.

6. The positioner according to claim 5, wherein the levers are formed from a single cross member, the flexible hinge being provided by a thinned section of the cross member.

7. The positioner according to claim 1, wherein each lever and its support wall are of unitary construction, the flexible connection being provided by a thinned junction section.

8. The positioner according to claim 1, wherein the fulcrums are moveable relative to one another such that the sample platform may be rotated with respect to the base.

9. The positioner according to claim 1, wherein the sample platform is mounted on the levers by a pair of output linkages which are stiff in respect of forces applied along their axes of extent.

10. The positioner according to claim 9, wherein the output linkages are deformable in respect of forces applied transverse to their axes of extent.

11. The positioner according to claim 9, wherein the output linkages extend away from the levers on the same side as that on which the drive mechanism is located.

12. The positioner according to claim 9, wherein the output linkages extend substantially parallel to a drive axis along which the drive mechanism supplies an actuation force.

13. The positioner according to claim 1, further comprising biasing elements connected to each lever and arranged to resist movement of the levers relative to the base and so provide a restoring force when the levers are moved.

14. The positioner according to claim 1, further comprising a mechanical stop connected to each lever to limit the amount by which it can move relative to the base.

15. The positioner according to 1, wherein the mechanical advantage of the levers acts to move the sample platform by an amount which is more than the movement of the drive mechanism.

16. The positioner according to claim 1, wherein the mechanical advantage of the levers acts to move the sample platform by an amount which is less than the movement of the drive mechanism.

17. The positioner according to claim 1, further comprising one or more strain gauges for measuring the positions of the levers.

18. The positioner according to claim 17, wherein the one or more strain gauges are coupled to respective bridge measuring circuits mounted on the positioner.

19. The positioner according to claim 1, comprising a further plurality of levers extending away from each other, the further levers being connected to the base and the drive mechanism so that actuation of the drive mechanism is transmitted to the further levers to cause them to move with respect to the base.

20. The positioner according to claim 19, each further lever being rotatably mounted on a fulcrum, thereby subdividing the further levers into inner and outer arms with the inner arms connected to the drive mechanism and the outer arms connected to the base.

21. The positioner according to claim 19, the drive mechanism being arranged to act on each of the further levers in the same direction.

22. The positioner according to claim 19, the drive mechanism being arranged to act on the further levers in a direction which is different to that in which it acts on the first mentioned levers.

23. The positioner according to claim 19, each of the further levers being aligned with a corresponding one of the first mentioned levers.

24. The positioner according to claim 19, the further levers being connected together by a flexible hinge.

25. The positioner according to claim 24, wherein the further levers are formed from a single cross member, the flexible hinge being provided by a thinned section of the cross member.

26. The positioner according to claim 20, the support walls also supporting the further levers, the further levers being connected to the support walls by flexible connections for providing the fulcrums.

27. The positioner according to claim 26, wherein each further lever and its support wall are of unitary construction, the flexible connection being provided by a thinned section at their junction.

28. The positioner according to claim 26, wherein the first mentioned, levers, the support walls and the further levers are of unitary construction.

29. The positioner according to claim 19, wherein the further levers are connected to the base by a pair of input linkages which are stiff in respect of forces applied along their axes of extent.

30. The positioner according to claim 29, wherein the input linkages are deformable in respect of forces applied transverse to their axes of extent.

31. The positioner according to claim 29, wherein the input linkages extend away from the input levers on the same side as that on which the drive mechanism is located.

32. The positioner according to claim 29, wherein the input linkages extend substantially parallel to a drive axis along which the drive mechanism supplies an actuation force.

33. The positioner according to claim 19, further comprising biasing elements connected to each further lever and arranged to resist movement of the further levers relative to the base and so provide a restoring force when the further levers are moved.

34. The positioner according to claim 19, further comprising a mechanical stop connected to each further lever to limit the amount by which it can move relative to the base.

35. The positioner according to claim 19, further comprising one or more strain gauges for measuring the positions of the further levers.

36. The positioner according to claim 35, wherein the one or more strain gauges are coupled to respective bridge measuring circuits mounted on the positioner.

37. The multi-axis positioner comprising a first positioner according to claim 1 aligned along a first direction and a second positioner according to claim 1 aligned along a second, different, direction, the first and second positioners connecting between a common base and a common sample platform.

38. The multi-axis positioner according to claim 37, wherein the first direction and the second direction are orthogonal to one another.

39. The multi-axis positioner according to claim 37, further comprising a third positioner according to claim 1 aligned along a third direction, the third direction being different to the first and second directions, the third positioner connecting between the common base and the common sample platform.

40. The multi-axis positioner according to claim 39, wherein the third direction is orthogonally arranged with respect to at least one of the first or second directions.

* * * * *